US009832119B2

(12) United States Patent
Imamura

(10) Patent No.: US 9,832,119 B2
(45) Date of Patent: Nov. 28, 2017

(54) COMMUNICATION BLOCK APPARATUS AND COMMUNICATION BLOCK METHOD

(71) Applicant: PFU LIMITED, Kahoku-shi, Ishikawa (JP)

(72) Inventor: Shinya Imamura, Kahoku (JP)

(73) Assignee: PFU LIMITED, Ishikawa (JP)

( * ) Notice: Subject to any disclaimer, the term of this patent is extended or adjusted under 35 U.S.C. 154(b) by 761 days.

(21) Appl. No.: 13/940,297

(22) Filed: Jul. 12, 2013

(65) Prior Publication Data

US 2014/0059214 A1 Feb. 27, 2014

(30) Foreign Application Priority Data

Aug. 21, 2012 (JP) .................. 2012-182654

(51) Int. Cl.
G06F 15/16 (2006.01)
H04L 12/721 (2013.01)

(52) U.S. Cl.
CPC .................. H04L 45/70 (2013.01)

(58) Field of Classification Search
USPC ........................................ 709/227
See application file for complete search history.

(56) References Cited

U.S. PATENT DOCUMENTS 6,026,096 A * 2/2000 Ferguson ............... H04L 12/433
370/452
7,002,943 B2 * 2/2006 Bhagwat .................. H04K 3/65
370/338

(Continued)

FOREIGN PATENT DOCUMENTS

CN 101883180 A 11/2010
JP 2004-145583 A 5/2004

(Continued)

OTHER PUBLICATIONS

Egevang, K. et al., The IP Network Address Translator (NAT), May 1994, the Internet Engineering Task Force, RFC 1631, pp. 1-10.*

(Continued)

Primary Examiner — Alicia Baturay
(74) Attorney, Agent, or Firm — Westerman, Hattori, Daniels & Adrian, LLP

(57) ABSTRACT

A communication block apparatus that blocks communication by an information processing apparatus connected to a network. The communication block apparatus includes a guide unit that guides information transmitted from the information processing apparatus, an identification information acquisition unit that acquires identification information for identifying a notified party of a message from the message of a predetermined protocol higher than a transport layer, the message including information guided by the guide unit, a permission determination unit that determines whether to permit communication by the message at least based on the identification information acquired by the identification information acquisition unit, and a communication permission unit that forwards the message to permit the communication by the information processing apparatus when the permission determination unit determines to permit the communication, regardless of the block of the communication by a communication block unit.

10 Claims, 9 Drawing Sheets

(56) References Cited

U.S. PATENT DOCUMENTS

| | | | | |
|---|---|---|---|---|
| 7,248,563 | B2* | 7/2007 | Bhogal | H04L 63/10 370/230 |
| 7,346,057 | B2* | 3/2008 | Foschiano | H04L 63/1466 370/392 |
| 7,440,434 | B2* | 10/2008 | Chaskar | H04W 8/005 370/338 |
| 7,751,393 | B2* | 7/2010 | Chaskar | H04W 8/005 370/338 |
| 8,862,735 | B1* | 10/2014 | Singh | H04L 41/085 709/221 |
| 9,038,182 | B2* | 5/2015 | Kim | H04L 63/1466 726/23 |
| 9,171,079 | B2* | 10/2015 | Banka | G06F 17/30864 |
| 9,225,793 | B2* | 12/2015 | Dutta | H04L 67/2804 |
| 9,275,093 | B2* | 3/2016 | Pandey | G06F 17/30333 |
| 2006/0291469 | A1* | 12/2006 | Omote | H04L 63/145 370/392 |
| 2007/0192500 | A1 | 8/2007 | Lum | |
| 2009/0017789 | A1* | 1/2009 | Thomas | H04L 12/14 455/406 |
| 2009/0198800 | A1* | 8/2009 | Dighe | H04L 29/12028 709/221 |
| 2011/0145273 | A1* | 6/2011 | Kolathaya | H04L 63/08 707/769 |
| 2011/0158208 | A1* | 6/2011 | Solanki | H04L 12/185 370/338 |
| 2012/0197856 | A1* | 8/2012 | Banka | H04L 67/2885 707/706 |
| 2013/0132567 | A1 | 5/2013 | Jlang et al. | |

FOREIGN PATENT DOCUMENTS

| | | |
|---|---|---|
| JP | 2007-336401 A | 12/2007 |
| JP | 2009-100226 A | 5/2009 |
| WO | 2007/138663 A1 | 12/2007 |

OTHER PUBLICATIONS

Notice of Reason for Rejection dated Aug. 4, 2015, issued in counterpart Japanese Application No. 2012-182654, with English translation (4 pages).

Office Action dated Mar. 3, 2016, issued in counterpart Chinese Application No. 201310368170.0, with English translation (18 pages).

* cited by examiner

FIG. 9

```
GET / HTTP/1.0
Host: www.pfu.co.jp
Accept: */*
Accept-Language: ja
UA-CPU: x86
Accept-Encoding: gzip, deflate
 . . . .
```

FIG. 10

```
GET http://www.pfu.co.jp/ HTTP/1.0
Host: www.pfu.co.jp
Accept: */*
Accept-Language: ja
UA-CPU: x86
Accept-Encoding: gzip, deflate
 . . . .
```

COMMUNICATION BLOCK APPARATUS AND COMMUNICATION BLOCK METHOD

CROSS-REFERENCE TO RELATED APPLICATION

This application is based upon and claims the benefit of priority of the prior Japanese Patent Application No. 2012-182654, filed on Aug. 21, 2012, the entire contents of which are incorporated herein by reference.

FIELD

The present disclosure relates to a communication block apparatus that blocks communication by an information processing apparatus connected to a network.

BACKGROUND

Conventionally, a communication control apparatus is proposed in a network communication system, wherein an access request for another device received from a client through a network is received to extract a destination IP address, the IP address is registered in a temporary registration IP address table as an IP address of the communication control apparatus, and a copy of a received frame is retransmitted to the network (see Japanese Laid-Open Patent Publication No. 2007-336401). Also proposed is a network access control method, wherein a proxy request apparatus receives a request of an access request apparatus to make a request to an authentication processing apparatus based on authentication data of the proxy request apparatus, and the authentication processing apparatus receives the request to distribute access control data based on an authentication processing result to an access control apparatus (see International Publication No. WO 2007/138663).

SUMMARY

According to the present disclosure, a communication block apparatus includes a guide unit that guides information transmitted from an information processing apparatus connected to a network to the communication block apparatus by notifying the information processing apparatus of a physical address of the communication block apparatus as a physical address of an apparatus other than the information processing apparatus; a communication block unit that blocks communication by the information processing apparatus by not forwarding information guided by the guide unit when a predetermined condition is satisfied; an identification information acquisition unit that acquires identification information for identifying a notified party of a message from the message of a predetermined protocol higher than a transport layer, the message including the information guided by the guide unit; a permission determination unit that determines whether to permit communication by the message at least based on the identification information acquired by the identification information acquisition unit; and a communication permission unit that forwards the message to permit the communication by the information processing apparatus when the predetermined condition is satisfied and the permission determination unit determines to permit the communication, regardless of the block of the communication by the communication block unit.

The present disclosure also provides a method executed by a computer or a program executed in a computer. Further, the present disclosure also provides a recording medium readable by a computer or another device or mechanism and having such a program recorded thereon. The computer medium readable by a computer or the like as referred to herein is a recording medium that can accumulate information such as data of programs by electrical, magnetic, optical, mechanical, or chemical action, so that this information could be read by a computer or the like.

BRIEF DESCRIPTION OF DRAWINGS

FIG. 9 is an example of (part of) a request header of an HTTP request message for a Web server; and FIG. 10 is an example of (part of) a request header of an HTTP request message for the proxy server.

DESCRIPTION OF EMBODIMENTS

Embodiments of the present disclosure will now be described based on the drawings. In the present embodiments, a communication block apparatus according to the present disclosure is implemented as a sensor apparatus which blocks communication by a target apparatus that is an information processing apparatus connected to a network. The sensor apparatus permits communication by a message of HTTP (Hyper Text Transfer Protocol) that is a predetermined protocol higher than a transport layer in an OSI basic reference model. The embodiments described below illustrate examples for carrying out the present disclosure, and the embodiments do not limit the present disclosure to the specific configurations described below. It is preferable that specific configurations according to the embodiments are appropriately adopted in carrying out the present disclosure.

<Configuration>

Figure 1:
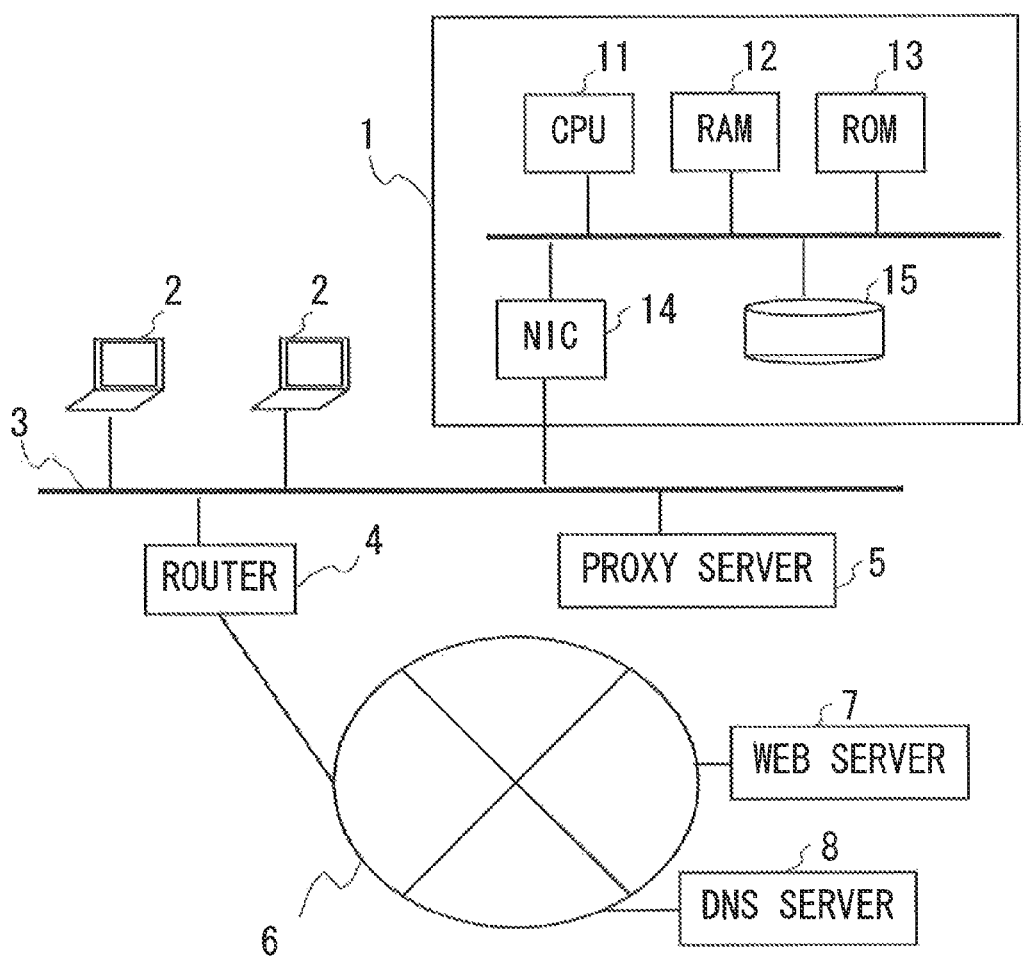
FIG. 1 is a schematic diagram illustrating a configuration of a communication system including a sensor apparatus according to the present embodiments.

FIG. 1 is a schematic diagram illustrating a configuration of a communication system including the sensor apparatus according to the present embodiments. The communication system according to the present embodiments includes: a sensor apparatus 1; a target apparatus 2 as an information processing apparatus including a Web browser and a like; a network segment 3 that forms an IP network; a router 4; a proxy server 5 that can perform HTTP communication by proxy; Internet 6; a Web server 7; and a DNS server 8 that manages an IP address corresponding to a host name of the Web server 7 to perform name resolution. The sensor apparatus 1, the target apparatus 2, the router 4, and the proxy server 5 are connected to the network segment 3. The network segment 3 is connected to the Internet 6 through the router 4. The Web server 7 and the DNS server 8 are connected to the Internet 6. In place of the Internet 6, the present communication system may be formed by an intranet, a WAN (Wide Area Network), or the like.

Since the router 4 permits communication from the proxy server 5 to the Internet 6, the proxy server 5 can communication with the Web server 7 and the DNS server 8. On the other hand, since the router 4 does not permit communication from the target apparatus 2 to the Internet 6, the target apparatus 2 cannot communicate with the Web server 7 by an HTTP message without the involvement of the proxy server 5. The target apparatus 2 cannot communicate with the DNS server 8.

The sensor apparatus 1 is a computer including a CPU (Central Processing Unit) 11, a RAM (Random Access Memory) 12, a ROM (Read Only Memory) 13, a NIC (Network Interface Card) 14, and an auxiliary storage apparatus 15 such as an HDD (Hard Disk Drive). The CPU 11 is a central processing unit, and the CPU 11 processes commands and data expanded in the RAM 12 and the like to control the RAM 12, the NIC 14, the auxiliary storage apparatus 15, and the like. The RAM 12 is a main storage apparatus and is controlled by the CPU 11. Various commands and data are written to and read from the RAM 12. The auxiliary storage apparatus 15 is a non-volatile auxiliary storage apparatus. Information to be maintained after the power of the computer is turned off, such as various programs including an OS (Operating System) loaded to the RAM 12 and a control program of communication, is mainly written to and read from the auxiliary storage apparatus 15.

The auxiliary storage apparatus 15 further stores: a forwarding IP address/port list that is a list of sets of IP addresses and port numbers indicating forwarding addresses for which forwarding of packets is specially permitted; a permitted server list indicating the Web servers 7 for which the HTTP communication from the target apparatus 2 is permitted; and access information for the proxy server 5, such as IP addresses, port numbers, and authentication information.

Like the sensor apparatus 1, the target apparatus 2 is a computer including a CPU, a PAM, a ROM, a NIC, the auxiliary storage apparatus 15 such as an HDD, and the like. Programs of a Web browser and the like are mounted on the target apparatus 2, and communication by a message of HTTP is possible through the NIC.

Figure 2:
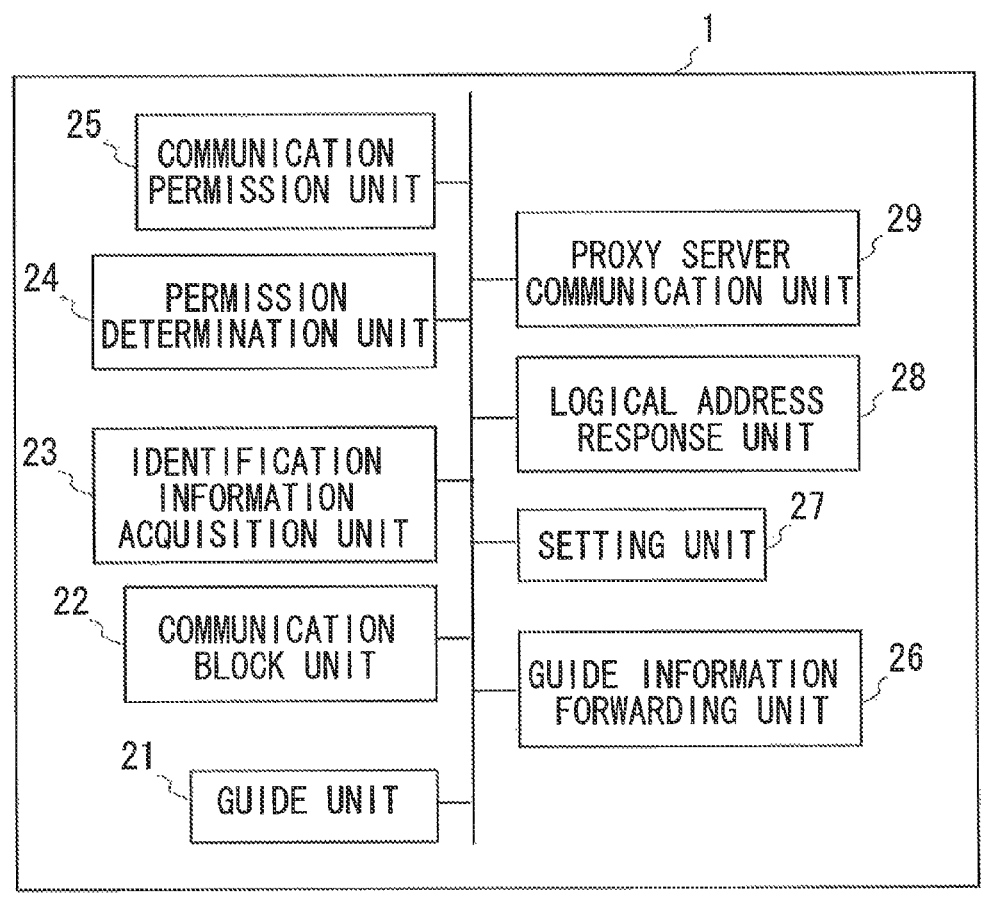
FIG. 2 depicts an outline of a functional configuration of the sensor apparatus according to the present embodiments.

FIG. 2 depicts an outline of a functional configuration of the sensor apparatus 1 according to the present embodiments. Programs recorded in the auxiliary storage apparatus 15 are read to the RAM 12 and executed by the CPU 11, and the sensor apparatus 1 functions as a computer including a guide unit 21, a communication block unit 22, an identification information acquisition unit 23, a permission determination unit 24, a communication permission unit 25, a guide information forwarding unit 26, a setting unit 27, a logical address response unit 28, and a proxy server communication unit 29. Although the CPU 11 as a general-purpose processor executes the functions of the computer in the present embodiments, one or a plurality of dedicated processors may execute part or all of the functions.

In the present embodiments, the guide unit 21 acquires, from the NIC 14, MAC frames (data) flowing through the network segment 3, the MAC frames including MAC frames with destination MAC addresses that are not the MAC address of the sensor apparatus 1. Based on a source MAC address, the guide unit 21 determines whether the target apparatus 2 is a target of communication block. If acquired data is data that is transmitted from the target apparatus 2 and that forms an ARP request packet, the guide unit 21 returns the MAC address as a physical address of the sensor apparatus 1 to the source target apparatus 2, by an ARP reply packet.

The MAC address returned to the source of the ARP request as the ARP reply is obtained by disguising a default gateway or a MAC address of another apparatus in the network segment 3 by the MAC address of the sensor apparatus 1. Therefore, according to the guide unit 21, the target apparatus 2 that has received the ARP reply registers, in an ARP table, an IP address of another apparatus in the network segment 3, to which the target apparatus 2 attempts to transmit the IP address, in association with the MAC address of the sensor apparatus 1 as the MAC address of the other apparatus. Therefore, the guide unit 21 can guide the IP packet transmitted from the target apparatus 2 to the sensor apparatus 1.

The communication block unit 22 acquires the IP packet guided by the guide unit 21 from the NIC 14. The communication block unit 22 does not forward the IP packet in principle, except when the destination IP address and the destination port number in the acquired IP packet are included in the forwarding IP address/port list stored in the auxiliary storage apparatus 15. Therefore, the guided IP packet is not forwarded to the other apparatus in principle, and communication with the other apparatus by the target apparatus 2 is blocked.

In the present embodiments, a predetermined condition for the communication block unit 22 to block the communication is that the destination IP address is not included in the forwarding IP address/port list. The predetermined condition for blocking the communication may be a condition not related to the destination port number in the packet guided to the sensor apparatus 1 or may be a condition related to another element such as the source MAC address and the source IP address of the IP packet.

The guide information forwarding unit 26 acquires the IP packet guided by the guide unit 21 from the NIC 14. The guide information forwarding unit 26 forwards the IP packet to another apparatus with a MAC address that corresponds to the destination IP address and that is not disguised, if the destination IP address and the destination port number in the acquired IP packet are included in the forwarding IP address/port list stored in the auxiliary storage apparatus 15, i.e. if the predetermined condition for the communication block unit 22 to block the communication is not satisfied. Therefore, the target apparatus 2 can perform part of the communication without the block of the communication.

The identification information acquisition unit 23 analyzes the IP packet guided by the guide unit 21, and if the IP packet includes a request message of HTTP, the identification information acquisition unit 23 acquires, from Host in a request header, the host name as identification information for identifying the notified party of the request message. The host name may be acquired based on a URI (Uniform Resource Identifier) of a request line in the request message.

The setting unit 27 sets the Web server 7 for which the HTTP communication from the target apparatus 2 is permitted by the communication permission unit 25, regardless of the communication block by the communication block unit 22. The setting is described in a list of domain names, and a permitted server list is stored in the auxiliary storage apparatus 15. The domain names as elements of the list can be described in any of a format of FQDN (Fully Qualified Domain Name) and formats that are not FQDN. For example, "www.pfu.co.jp" can be described as the FQDN, and "pfu.co.jp" can be described as a domain name that is not the FQDN. The FQDN is description of the entire host name, and the domain name that is not the FQDN is description of part of the host name. The description of the domain name that is not the FQDN denotes that permission of the HTTP communication to all hosts (Web servers 7) belonging to the domain indicated by the domain name is set. For example, description of "pfu.co.jp" denotes that permission of the HTTP communication with a plurality of Web servers 7, such as "www.pfu.co.jp" and "web.pfu.co.jp", is set.

Large-scale communication systems, mission-critical systems, and the like often include a plurality of servers for redundancy or for performance improvement. Even if there are a plurality of permitted Web servers 7, the setting unit 27 can use domain names to collectively describe the setting of the Web servers 7 for which the communication is permitted. Therefore, the workload of the system manager can be reduced compared to when the Web servers 7 are individually described one by one. Even if the IP address is changed as a result of a change in the network configuration of the communication system, the setting does not have to be changed because the description is set by the domain names, and the setting unit 27 can reduce the workload of the system manager. As for the setting of the Web servers 7 for which the HTTP communication from the target apparatus 2 is permitted, a list of servers not permitted may be described and stored. Regular expressions or wild cards may be used to describe the elements of the permitted server list.

The permission determination unit 24 compares the host name acquired by the identification information acquisition unit 23 and the elements in the permitted server list, based on character strings. If the host name includes an element (character string of the domain name that is not FQDN, which is all or part of the host name) in the permitted server list (including a case in which the host name coincides with an element), the permission determination unit 24 determines to permit the HTTP communication from the target apparatus 2. If all elements in the permitted server list are not included in the host name, the permission determination unit 24 determines not to permit the HTTP communication from the target apparatus 2. In addition to the host name acquired by the identification information acquisition unit 23, the permission determination unit 24 may determine to permit the HTTP communication based on, for example, whether the method name in the request message or the URI indicating the resource satisfies a predetermined condition.

When the permission determination unit 24 determines to permit the HTTP communication, the communication permission unit 25 forwards a request message of HTTP included in a packet not forwarded by the communication block unit 22 to thereby permit the HTTP communication by the target apparatus 2. In the forwarding of the request message, the communication permission unit 25 establishes connection of TCP (Transmission Control Protocol) between the sensor apparatus 1 and the forwarding destination.

The destination IP address and the destination port number of the proxy server 5 are used in the HTTP communication through the proxy server 5, even if the Web servers 7 that provide substantial resources (Web content) are different. Therefore, the Web servers 7 of the transmission destinations cannot be distinguished in the message analysis of protocol below the transport layer. According to the identification information acquisition unit 23, the permission determination unit 24, and the communication permission unit 25 of the present embodiments, communication is permitted based on the host name of the transmission destination included in the HTTP message from the target apparatus 2. Therefore, in the communication through the proxy server 5, communication with part of the Web servers 7 can be permitted, and communication with the other Web servers 7 can be blocked.

When the IP packet guided by the guide unit 21 forms a DNS inquiry that is an inquiry of a logical address corresponding to the host name, the logical address response unit 28 returns the IP address of the sensor apparatus 1 as a predetermined logical address, not the IP address of the Web server 7, in response to the DNS inquiry if the inquired name indicates the Web server 7 for which the HTTP communication from the target apparatus 2 set by the setting unit 27 is permitted. Therefore, the target apparatus 2 can perform name resolution of the Web server 7, even in an environment that does not allow communication with the DNS server 8. Particularly, the target apparatus 2 without the communication setting for the proxy server 5 attempts to perform the name resolution of the Web server 7 for the communication. Therefore, the logical address response unit 28 can prevent the name resolution from failing. The predetermined logical address returned by the logical address response unit 28 may be an IP address other than the IP address of the sensor apparatus 1.

In the response to the DNS inquiry, the logical address response unit 28 sets, as a TTL value of the response message, a value (for example, 60 seconds) smaller than a TTL (Time To Live) value set by the DNS server 8 in the name resolution of the host name of the Web server 7. The target apparatus 2 that has received the response message handles the TTL value as a validity period of the IP address of the sensor apparatus 1 that is the logical address corresponding to the host name of the Web server 7. Therefore, the target apparatus 2 is connected to another network in which the sensor apparatus 1 is not arranged, and regular DNS information can be quickly acquired from the DNS server 8 when there is no more effect of the block of the communication by the sensor apparatus 1. The TTL value set by the logical address response unit 28 may be a value equal to or greater than the TTL value set by the DNS server 8 in the name resolution of the host name of the Web server 7.

The proxy server communication unit 29 uses the access information for the proxy server 5 stored in the auxiliary storage apparatus 15 to communicate with the proxy server 5 through the NIC 14.

First Embodiment

Communication and processing in a first embodiment will be described with reference to the drawings.

<Flow of Communication in Communication System>

A flow of communication in a communication system including the sensor apparatus 1 according to the first embodiment will be described. In the communication system of the first embodiment, communication with part of the Web servers 7 is permitted in the communication from the target apparatus 2 through the proxy server 5, and communication with the other servers is blocked.

Figure 3:
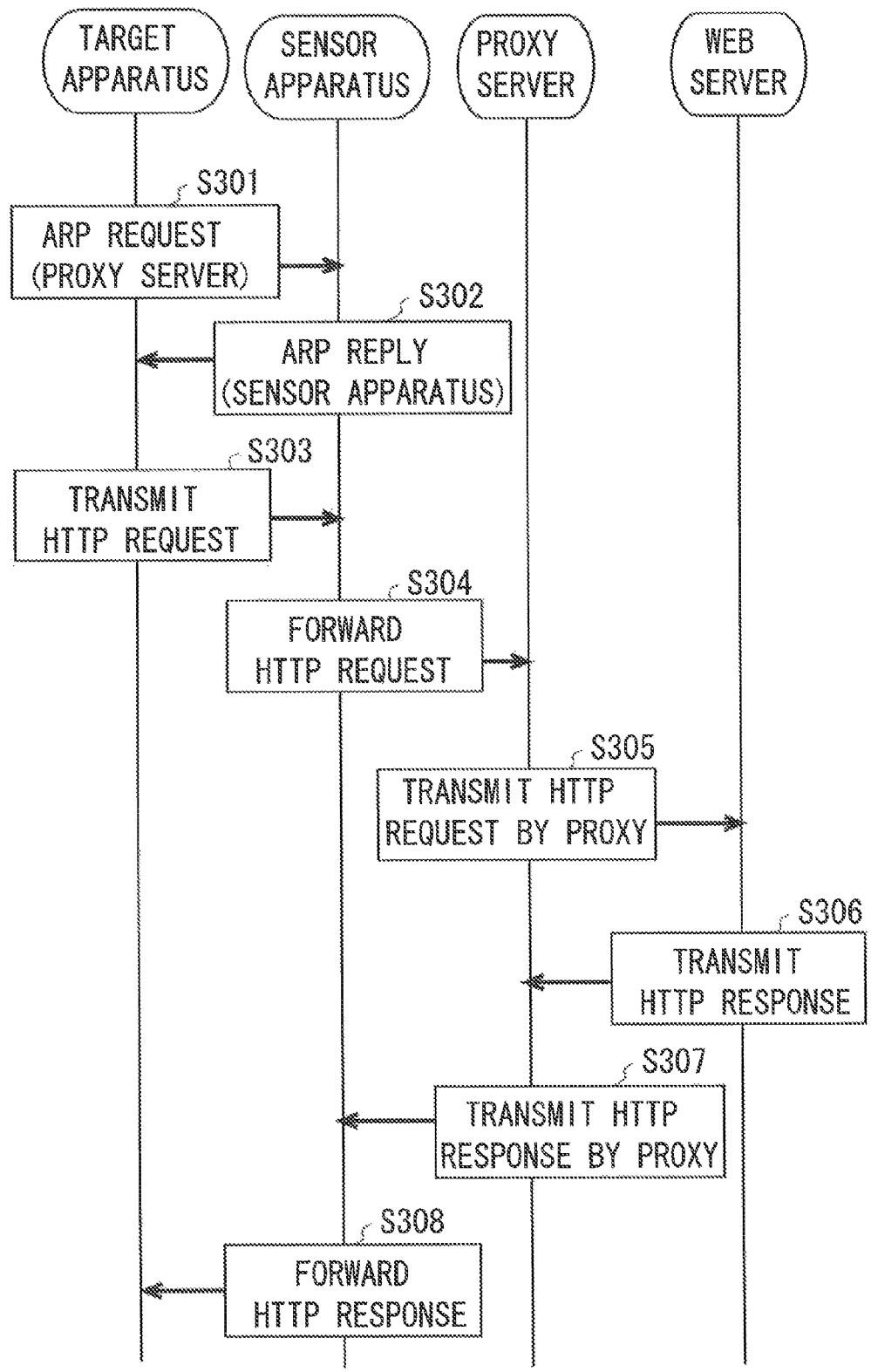
FIG. 3 is a sequence diagram illustrating an example of communication in a communication system including the sensor apparatus according to a first embodiment.

FIG. 3 is a sequence diagram illustrating an example of the communication in the communication system including the sensor apparatus 1 according to the first embodiment. In the first embodiment, the access information of the proxy server 5 is set to the target apparatus 2. The host name of the Web server 7 is set in the permitted server list in the sensor apparatus 1. In FIG. 3, the HTTP communication with the Web server 7 by the target apparatus 2 is permitted in the sensor apparatus 1 and is realized through the sensor apparatus 1 and the proxy server 5.

To communicate with the proxy server 5, the target apparatus 2 connected to the network segment 3 performs broadcast transmission of an ARP request regarding the proxy server 5 (step S301). The guide unit 21 of the sensor apparatus 1 that has received the ARP request returns an ARP reply packet including the MAC address of the sensor apparatus 1 to the source target apparatus 2 (step S302). The target apparatus 2 that has received the ARP reply packet registers the MAC address of the sensor apparatus 1 in the ARP table, the MAC address serving as a MAC address corresponding to the IP address of the proxy server 5.

The target apparatus 2 transmits a request message of HTTP for communication with the Web server 7 to the proxy server 5 (step S303). In the transmission packet, the destination MAC address is the MAC address of the sensor apparatus 1, the destination IP address is addressed to the proxy server 5, and Host of the request header is the host name of the Web server 7. Since the IP address of the proxy server 5 is not included in the forwarding IP address/port list, the guide information forwarding unit 26 of the sensor apparatus 1 that has received the request message does not forward the IP packet that forms the request message.

The identification information acquisition unit 23 of the sensor apparatus 1 acquires the host name from the request message, and the permission determination unit 24 permits the HTTP communication based on the host name. The communication permission unit 25 of the sensor apparatus 1 forwards the request message received from the target apparatus 2 to the proxy server 5 (step S304). If the host name of the Web server 7 is not set in the permitted server list, the identification information acquisition unit 23 does not permit the HTTP communication. Therefore, the HTTP communication is blocked.

In steps S305 to S307, the proxy server 5 communicates with the Web server 7 by proxy. The proxy server 5 that has received the request message transmits the request message to the Web server 7 by proxy (step S305). The Web server 7 that has received the request message from the proxy server 5 generates a response message and transmits the response message to the proxy server 5 (step S306). The proxy server 5 that has received the response message from the Web server 7 transmits the response message by proxy (step S307).

The sensor apparatus 1 that has received the response message forwards the response message to the target apparatus 2 as the sender of the request message (step S308).

<Flows of Processes of Sensor Apparatus>

The example of the communication described above is realized by processing of reception data of the sensor apparatus 1. Flows of the processing of the reception data of the sensor apparatus 1 according to the first embodiment will be described with reference to flow charts of FIGS. 4 and 5. Specific details and orders of the processes illustrated in the flow charts are examples, and it is preferable that processing details and orders suitable for the embodiment are appropriately adopted.

Figure 4:
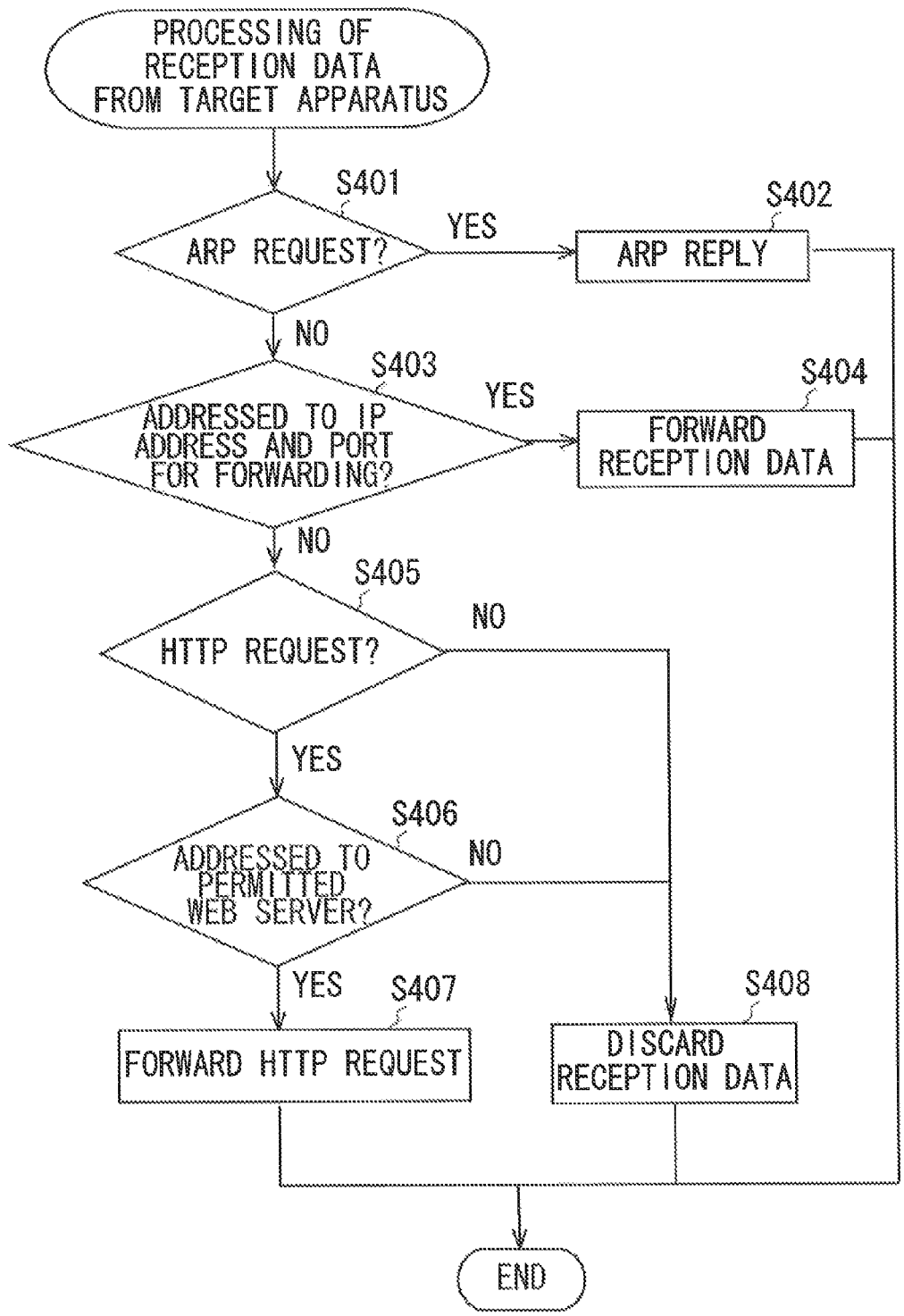
FIG. 4 is a flow chart illustrating a flow of processing of reception data from a target apparatus in the sensor apparatus according to the first embodiment.

FIG. 4 is a flow chart illustrating a flow of processing of reception data from the target apparatus 2 in the sensor apparatus 1 according to the first embodiment. The processing of reception data from the target apparatus 2 is started when the sensor apparatus 1 receives the data transmitted by the target apparatus 2.

In steps S401 and S402, processing of an ARP request from the target apparatus 2 is executed. The guide unit 21 determines whether the reception data from the target apparatus 2 is an ARP request (step S401). If it is determined that the reception data from the target apparatus 2 is an ARP request in step S401, the guide unit 21 returns an ARP reply packet including the MAC address of the sensor apparatus 1 to the source target apparatus 2 (step S402). If it is determined that the reception data from the target apparatus 2 is not an ARP request in step S401, the process proceeds to step S403.

In steps S403 and S404, a process of forwarding the reception data from the target apparatus 2 is executed. The communication block unit 22 and the guide information forwarding unit 26 determine whether the reception data from the target apparatus 2 are addressed to an IP address and a port for forwarding, i.e. whether the destination IP address and the destination port number in the reception data are included in the forwarding IP address/port list (step S403). If it is determined that the reception data from the target apparatus 2 is addressed to an IP address and a port for forwarding in step S403, the guide information forwarding unit 26 forwards the reception data to another apparatus that corresponds to the destination IP address and that includes a MAC address not disguised (step S404). If it is determined that the reception data from the target apparatus 2 is not addressed to an IP address and a port for forwarding in step S403, the process proceeds to step S405.

A process of forwarding a request message of HTTP is executed in steps S405 to S407. The identification information acquisition unit 23 analyzes the reception data and determines whether a request message of HTTP is formed (step S405). If it is determined that a request message of HTTP is formed in step S405, the identification information acquisition unit 23 acquires the host name of the transmission destination of the request message from the reception data, and the permission determination unit 24 further determines whether the request message is addressed to the Web server 7 for which the communication is permitted, based on the host name acquired by the identification information acquisition unit 23 (step S406). If it is determined in step S406 that the request message is addressed to the Web server 7 for which the communication is permitted, the permission determination unit 24 determines to permit the HTTP communication from the target apparatus 2, and the communication permission unit 25 forwards the request message to the apparatus indicated by the destination IP address and the port number in the reception data (step S407).

If it is determined in step S405 that the request message of HTTP is not formed or if it is determined in step S406 that the request message is not addressed to the Web server 7 for which the communication is permitted, the reception data is discarded, and the request message of HTTP is not forwarded (step S408). If the reception data forms the request message of HTTP, the sensor apparatus 1 may transmit, to the target apparatus 2, a response message for redirecting the message to a predetermined URL in step S408. Through the transmission, the sensor apparatus 1 can provide the target apparatus 2, for which the HTTP communication is blocked, with predetermined information, such as a Web page, for applying for the usage of the communication system. If the reception data forms the request message of HTTP, the sensor apparatus 1 may cut off the connection related to the request message in step S408.

Figure 5:
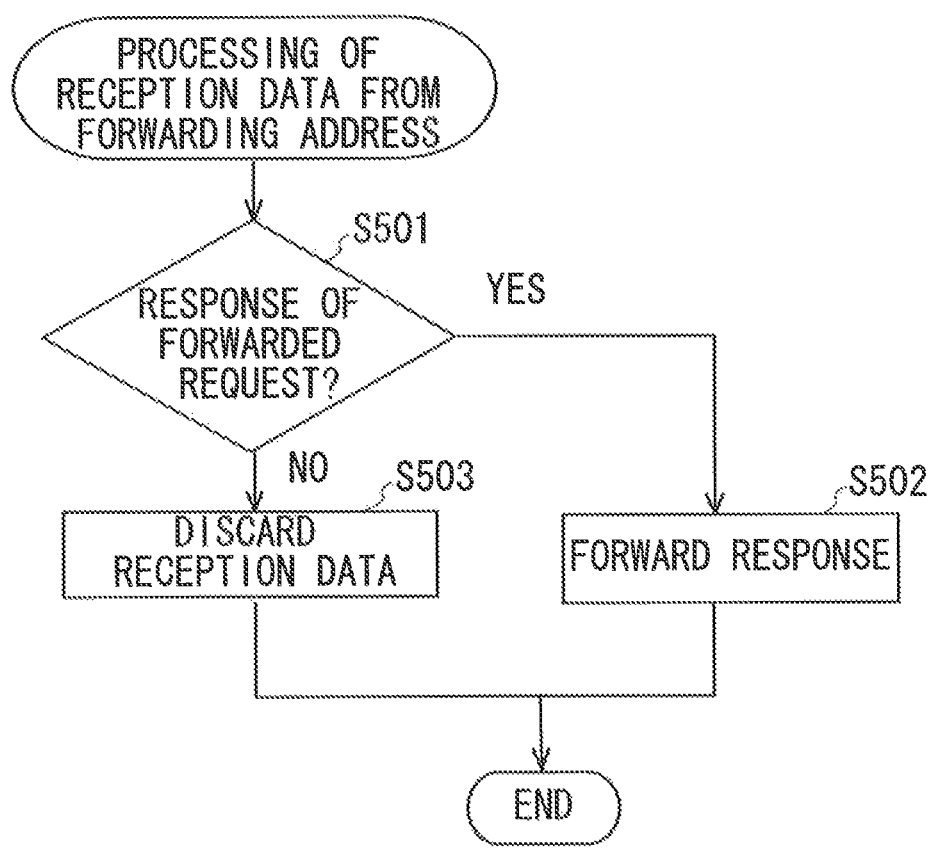
FIG. 5 is a flow chart illustrating a flow of processing of reception data from a request message forwarding address in the sensor apparatus according to the first embodiment.

FIG. 5 is a flow chart illustrating a flow of processing of reception data from the request message forwarding address in the sensor apparatus 1 according to the first embodiment. The processing of reception data from the request message forwarding address is started when the sensor apparatus 1 receives the data from the connection of TCP established in the request message forwarding by the communication permission unit 25 in step S407 of FIG. 4.

In steps S501 to S503, a process of forwarding a received response message of HTTP is executed. The sensor apparatus 1 determines whether the reception data is a response message (step S501). If it is determined that the reception data is a response message in step S501, the sensor apparatus 1 forwards the response message to the target apparatus 2 as the sender of the request message (step S502). If it is determined that the reception data is not a response message in step S501, the sensor apparatus 1 discards the reception data (step S503).

According to the sensor apparatus 1 of the first embodiment, communication with part of the Web servers 7 can be permitted, and communication with the other Web servers 7 can be blocked according to the transmission destination in the HTTP communication from the target apparatus 2 connected to the network segment 3, even in the HTTP communication through the proxy server 5. According to the sensor apparatus 1 of the first embodiment, the permission of the communication by the message of HTTP is determined regardless of whether the communication is addressed to the proxy server 5. Therefore, the communication can be permitted and blocked based on the setting by the host name even in the HTTP communication without the involvement of the proxy server 5. For the communication system in which the proxy server 5 is already arranged and in which the setting of the proxy server 5 is already performed in the target apparatus 2, the HTTP communication from the target apparatus 2 (including the HTTP communication involving the proxy server 5) can be permitted and blocked just by arranging the sensor apparatus 1, without changing the configuration of the network or the setting of the IP address.

Although the sensor apparatus 1 according to the first embodiment permits and blocks the HTTP communication, the sensor apparatus 1 may permit and block communication of SMTP (Simple Mail Transfer Protocol), for example.

Second Embodiment

Communication and processing in a second embodiment will be described with reference to the drawings.

<Flow of Communication in Communication System>

A flow of communication in a communication system including the sensor apparatus 1 according to the second embodiment will be described. In the communication system of the second embodiment, the target apparatus 2 not provided with the access information of the proxy server 5 can perform HTTP communication with the Web server 7 for which the communication is permitted.

Figure 6:
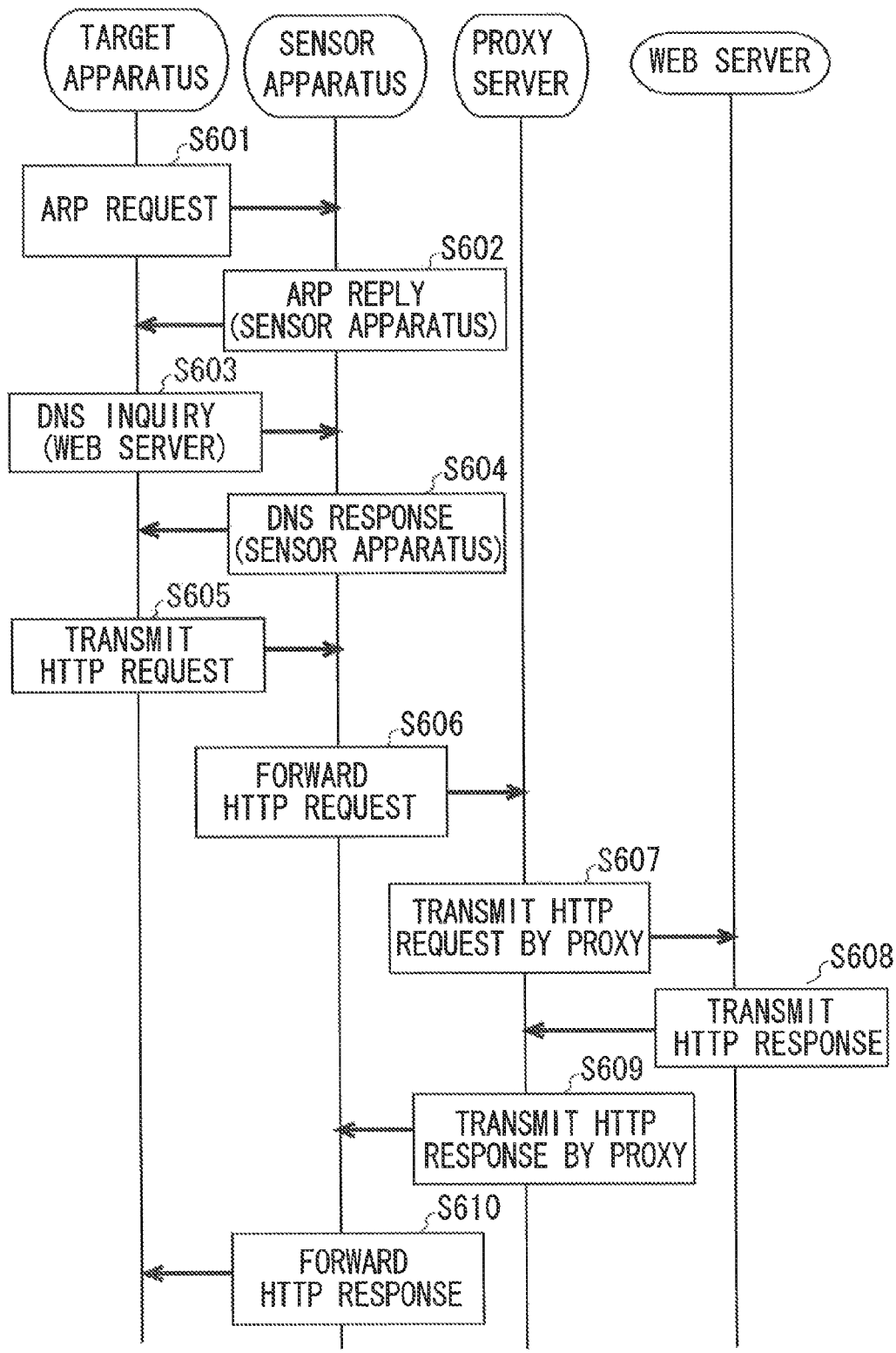
FIG. 6 is a sequence diagram illustrating an example of communication in a communication system including the sensor apparatus according to a second embodiment.

FIG. 6 is a sequence diagram illustrating an example of communication in the communication system including the sensor apparatus 1 according to the second embodiment. In FIG. 6, HTTP communication with the Web server 7 by the target apparatus 2 not provided with the access information of the proxy server 5 is permitted in the sensor apparatus 1, and the HTTP communication is realized through the sensor apparatus 1 and the proxy server 5. In this example of communication, the setting unit 27 of the sensor apparatus 1 sets the host name of the Web server 7 in the permitted server list in advance.

In steps S601 and S602, as in the first embodiment, the ARP request and the ARP reply are transmitted, and the MAC address of the sensor apparatus 1 is registered in the ARP table of the target apparatus 2.

The target apparatus 2 transmits a DNS inquiry for performing name resolution of the host name of the Web server 7 (step S603). Since the destination MAC address is the MAC address of the sensor apparatus in the transmission packet, the sensor apparatus 1 receives the DNS inquiry.

The logical address response unit 28 of the sensor apparatus 1 that has received the DNS inquiry returns the IP address of the sensor apparatus 1 to the target apparatus 2 (step S604).

The target apparatus 2 transmits a request message of HTTP for communication with the Web server 7 to the sensor apparatus 1 (step S605). The destination IP address in this case is the IP address of the sensor apparatus 1 returned in response to the DNS inquiry.

The identification information acquisition unit 23 of the sensor apparatus 1 that has received the request message acquires the host name from the request message, and the permission determination unit 24 permits the HTTP communication based on the host name. The communication permission unit 25 of the sensor apparatus 1 changes the request message received from the target apparatus 2 to a request message for the proxy server 5 and forwards the request message to the proxy server 5 (step S606).

In steps S607 to S609, the proxy server 5 communicates with the Web server 7 by proxy, as in the first embodiment.

The sensor apparatus 1 forwards the response message to the target apparatus 2 as the sender of the request message, as in the first embodiment (step S610).

<Flows of Processes of Sensor Apparatus>

The example of the communication described above is realized by processing of reception data of the sensor apparatus 1. Flows of processing of the reception data of the sensor apparatus 1 according to the second embodiment will be described with reference to flow charts of FIGS. 7 and 8. Specific details and orders of the processes illustrated in the flow charts are examples, and it is preferable that processing details and orders suitable for the embodiment are appropriately adopted.

Figure 7:
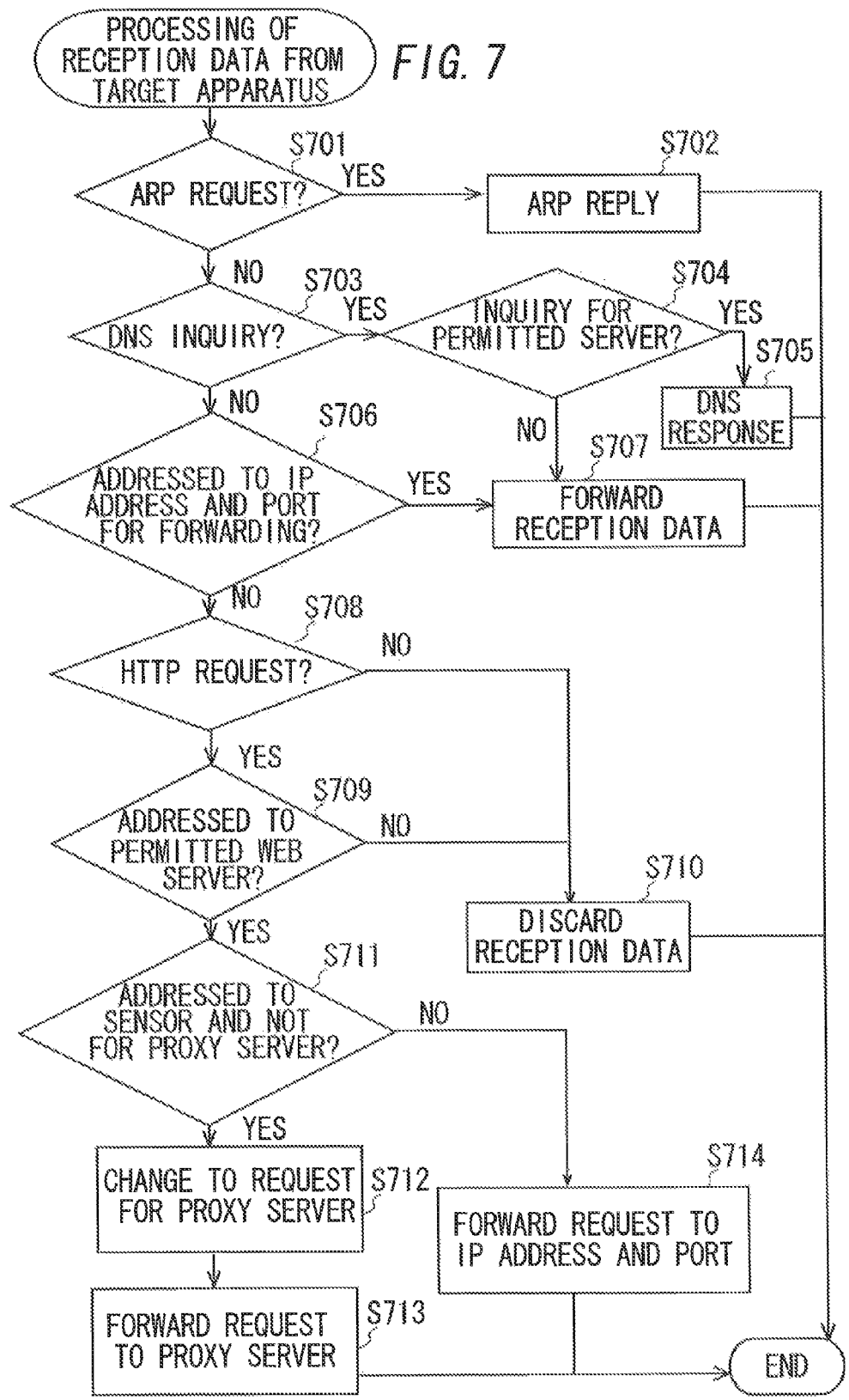
FIG. 7 is a flow chart illustrating a flow of processing of reception data from the target apparatus in the sensor apparatus according to the second embodiment.

FIG. 7 is a flow chart illustrating a flow of processing of reception data from the target apparatus 2 in the sensor apparatus 1 according to the second embodiment. The processing of reception data from the target apparatus 2 is started when the sensor apparatus 1 receives the data transmitted by the target apparatus 2.

In steps S701 and S702, processing of the ARP request from the target apparatus 2 is executed as in steps 401 and 402 of FIG. 4 in the first embodiment.

In steps S703 to S705, processing of a DNS inquiry of the target apparatus 2 is executed. The logical address response unit 28 determines whether the reception data forms a DNS inquiry (step S703). If it is determined that the reception data forms a DNS inquiry in step S703, the logical address response unit 28 determines whether the inquired name indicates the Web server 7 for which the HTTP communication is permitted (step S704). If it is determined that the inquired name indicates the Web server 7 for which the HTTP communication is permitted in step S704, the logical address response unit 28 returns the IP address of the sensor apparatus 1 (step S705). If it is determined that the reception data does not form a DNS inquiry in step S703, the process proceeds to step S706. If it is determined in step S704 that the inquired name does not indicate the Web server 7 for which the HTTP communication is permitted, the process proceeds to step S707.

In steps S706 and S707, the process of forwarding the reception data from the target apparatus 2 is executed as in steps S403 and S404 of FIG. 4 in the first embodiment.

In steps S708 to S710, the reception data is discarded as in steps S405, S406, and S408 of FIG. 4 in the first embodiment.

In steps S711 to S714, a request message is forwarded. The communication permission unit 25 determines whether the destination IP address of the reception data is the IP address of the sensor apparatus 1 and whether the request message is a message for the proxy server 5 (step S711). If the request message includes relative information based on the host name, it is determined that the message is not for the proxy server 5. If the request message does not include relative information based on the host name, it is determined that the message is for the proxy server 5.

In the second embodiment, whether the request message includes the relative information based on the host name depends on whether the URI of the request line is a URI in a relative format. FIG. 9 is an example of (part of) a request header of an HTTP request message for the Web server 7. FIG. 10 is an example of (part of) a request header of an HTTP request message for the proxy server 5. Both of FIGS. 9 and 10 illustrate request headers for acquiring resources indicated by "http://www.pfu.co.jp". The URI of FIG. 9 is "/" which is a URI in a relative format based on the host name "www.pfu.co.jp". The URI of FIG. 10 is "http://www.pfu.co.jp" which is a URI in an absolute format.

If it is determined in step S711 that the destination IP address of the reception data is the IP address of the sensor apparatus 1 and that the request message is not the message for the proxy server 5, the communication permission unit 25 rewrites the URI of the request line by the absolute format to change the request message to a message for the proxy server 5 (step S712). The communication permission unit 25 forwards the request message changed in step S712 to the proxy server 5 through the proxy server communication unit 29 (step S713). If it is determined in step S711 that the destination IP address of the reception data is the IP address of the sensor apparatus 1 and that the request message is the message for the proxy server 5, the communication permission unit 25 forwards the request message to an apparatus indicated by the destination IP address and the port number in the reception data, as in step S407 of FIG. 4 in the first embodiment (step S714). In step S714, the request message is forwarded without being changed to the message for the proxy server 5.

Figure 8:
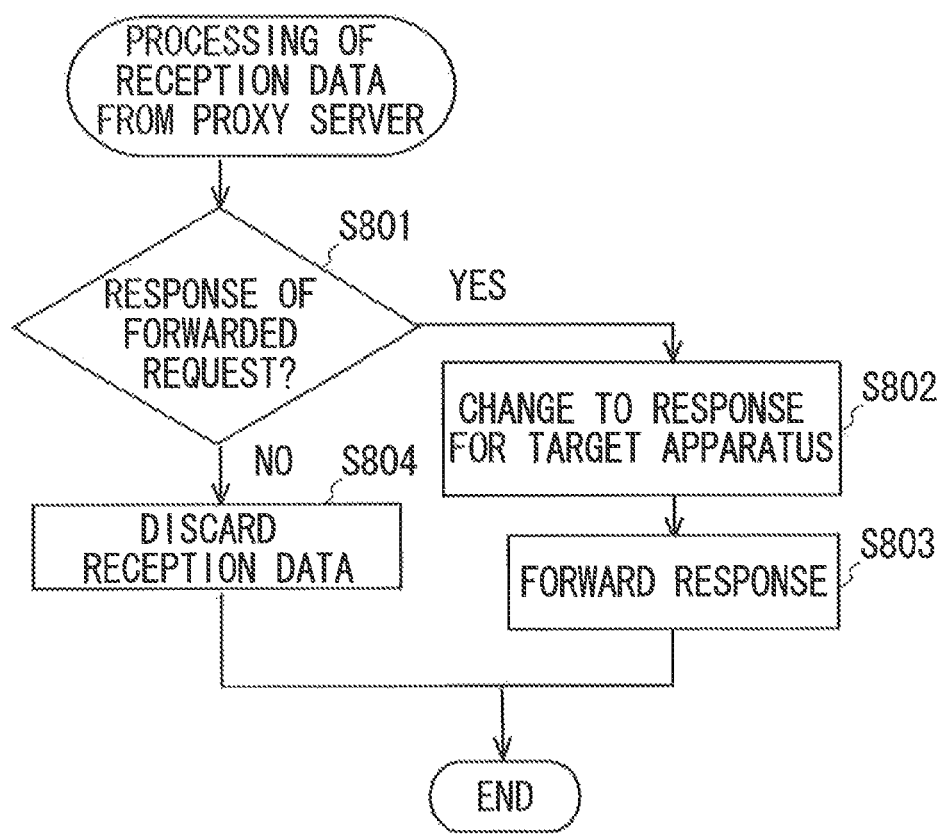
FIG. 8 is a flow chart illustrating a flow of processing of reception data from a proxy server in the sensor apparatus according to the second embodiment.

FIG. 8 is a flow chart illustrating a flow of processing of reception data from the proxy server 5 in the sensor apparatus 1 according to the second embodiment. The processing of reception data from the proxy server 5 is started when the sensor apparatus 1 receives the data from the connection of TCP established in the request message forwarding by the communication permission unit 25 in step S713 of FIG. 7. The process when the data is received from the connection of TCP established in the request message forwarding by the communication permission unit 25 in step S714 of FIG. 7 is similar to the process in the first embodiment described with reference to FIG. 5. Therefore, the description will not be repeated.

The sensor apparatus 1 determines whether the reception data is a response message (step S801). If it is determined that the reception data is a response message in step S801, the request message is changed to a response message for the target apparatus 2 (step S802), and the changed response message is forwarded to the target apparatus 2 as the sender of the request message (step S803). If it is determined that the reception data is not a response message in step S801, the reception data is discarded (step S804).

Some mobile terminals and the like cannot perform communication setting for the proxy server 5. Conventionally, there a is problem that an information processing apparatus that cannot perform communication setting for the proxy server 5 or an information processing apparatus that has not performed communication setting for the proxy server 5 cannot perform communication through the proxy server 5. Therefore, particularly when a company attempts to implement a new cloud service, it is inconvenient that work of performing communication setting for the proxy server 5 is required in all information processing apparatuses for using the cloud service, or it is inconvenient that mobiles terminals and the like that cannot perform communication setting for the proxy server 5 cannot be used for the cloud service.

According to the sensor apparatus 1 of the second embodiment, the target apparatus 2 in which the setting of the proxy server 5 is not performed or in which the setting of the proxy server 5 cannot be performed can communicate with the Web server 7 through the proxy server 5. According to the sensor apparatus 1 of the second embodiment, in the network environment that requires the involvement of the proxy server 5 for the communication with the Web server 7, communication with part of the Web servers 7 can be permitted, and communication with the other Web servers 7 can be blocked according to the transmission destination, in the HTTP communication by the target apparatus 2 in which the setting of the proxy server 5 is not performed or in which the setting of the proxy server 5 cannot be performed. Even if a connection is made to the network segment 3 including both the target apparatus 2, in which the setting of the proxy server 5 is performed, and the target apparatus 2, in which the setting of the proxy server 5 is not performed or in which the setting of the proxy server 5 cannot be performed, the permission and the block of the HTTP communication can be comprehensively managed by one setting.

What is claimed is:

1. A communication block apparatus comprising:
a memory; and
a processor configured to
guide information transmitted from an information processing apparatus connected to a network to the communication block apparatus by notifying the information processing apparatus of a physical address of the communication block apparatus as a physical address of an apparatus other than the information processing apparatus;
set a physical layer decision to block communication by the information processing apparatus by not forwarding information guided by the processor when a predetermined condition is satisfied;
acquire identification information for identifying a notified party of a message from the message of a predetermined protocol higher than a transport layer, the message including the information guided by the processor;
determine an upper-layer decision, which is higher than the physical layer decision, whether to permit communication by the message at least based on the identification information acquired by the processor; and
forward the message which is guided by the processor to the apparatus other than the information processing apparatus to permit the communication by the information processing apparatus when the processor determines the upper-layer decision to permit the communication while the predetermined condition is satisfied and blocking of the communication is enabled, regardless of the physical layer decision to block of the communication by the processor.

2. The communication block apparatus according to claim 1, the processor further configured to forward the information guided by the processor to the apparatus other than the information processing apparatus when the predetermined condition is not satisfied.

3. The communication block apparatus according to claim 1, wherein processor forwards the message to the apparatus other than the information processing apparatus.

4. The communication block apparatus according to claim 1, the processor further configured to set all or part of the identification information of notified parties for which the communication by the message is permitted or notified parties for which the communication by the message is not permitted, wherein determine whether to permit the communication of the message based on whether the identification information acquired by the processor includes all or part of the identification information set by the processor.

5. The communication block apparatus according to claim 1, further comprising when the information guided by the processor includes an inquiry of a logical address corresponding to the identification information, a logical address response unit that returns, in response to the inquiry, a predetermined logical address that is not a logical address of the notified party identified by the identification information.

6. The communication block apparatus according to claim 5, wherein a validity period of the predetermined logical address is added to the response by the logical address response unit, and the validity period of the predetermined logical address is a validity period different from a validity period of the logical address of the notified party identified by the identification information, the validity period of the logical address of the notified party added to the response by a server that returns the logical address of the notified party in response to the inquiry.

7. The communication block apparatus according to claim 6, wherein the validity period of the predetermined logical address is a validity period shorter than the validity period of the logical address of the notified party identified by the identification information, the validity period of the logical address of the notified party added to the response by the server that returns the logical address of the notified party in response to the inquiry.

8. The communication block apparatus according to claim 5, the processor further configured to communicate with a proxy server that performs communication of the predetermined protocol by proxy, wherein when the information guided by the processor includes the predetermined logical address as a logical address of a destination and the message includes relative information based on the identification information, the processor changes the relative information in the message to absolute information not based on the identification information and forwards the changed message to the proxy server to permit the communication by the information processing apparatus.

9. A communication block method causing a computer to execute a process, the process comprising:

guiding information transmitted from an information processing apparatus connected to a network to the computer by notifying the information processing apparatus of a physical address of the computer as a physical address of an apparatus other than the information processing apparatus;

setting a physical layer decision to block communication by the information processing apparatus by not forwarding information guided in the guiding when a predetermined condition is satisfied;

acquiring identification information for identifying a notified party of a message from the message of a predetermined protocol higher than a transport layer, the message including the information guided in the guiding;

determining an upper-layer decision, which is higher than the physical layer decision, whether to permit communication by the message at least based on the identification information acquired in the acquiring; and forwarding the message to the apparatus other than the information processing apparatus to permit the communication by the information processing apparatus when the processor determines the upper-layer decision to permit the communication while the predetermined condition is satisfied and blocking of the communication is enabled, regardless of the physical layer decision to block of the communication in the blocking.

10. A computer-readable non-transitory recording medium recording a program causing a computer to execute a process, the process comprising:

guiding information transmitted from an information processing apparatus connected to a network to the computer by notifying the information processing apparatus of a physical address of the computer as a physical address of an apparatus other than the information processing apparatus;

setting a physical layer decision to block communication by the information processing apparatus by not forwarding information guided in the guiding when a predetermined condition is satisfied;

acquiring identification information for identifying a notified party of a message from the message of a predetermined protocol higher than a transport layer, the message including the information guided in the guiding;

determining an upper-layer decision, which is higher than the physical layer decision, whether to permit communication by the message at least based on the identification information acquired in the acquiring; and forwarding the message to the apparatus other than the information processing apparatus to permit the communication by the information processing apparatus when the processor determines the upper-layer decision to permit the communication while the predetermined condition is satisfied and blocking of the communication is enabled, regardless of the physical layer decision to block of the communication in the blocking.

* * * * *